June 19, 1945.  G. H. BURT  2,378,618
APPARATUS FOR PERFORATING MATERIAL
Filed Dec. 19, 1941  3 Sheets-Sheet 1
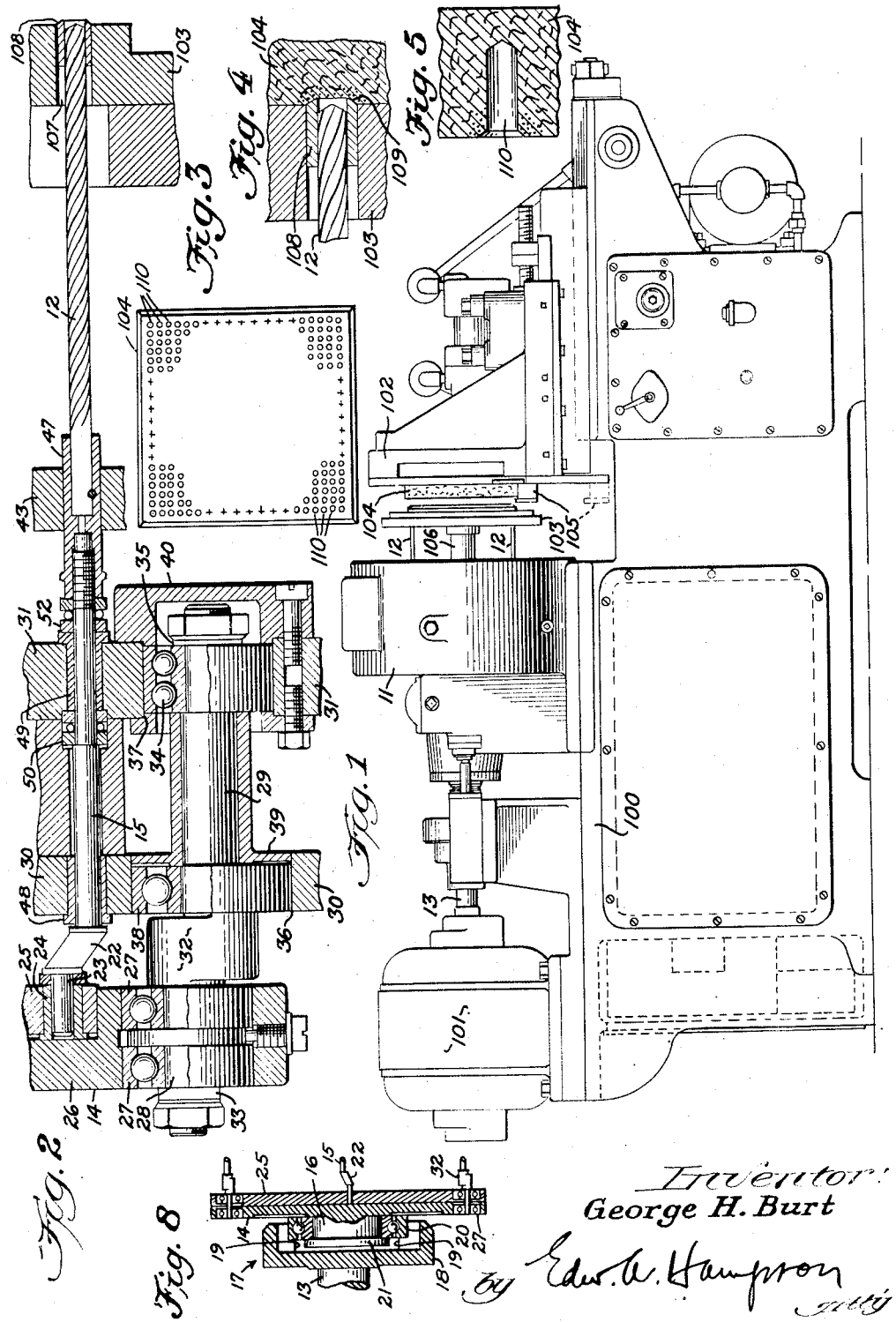
Inventor:
George H. Burt
by Edw. A. Hampson
atty

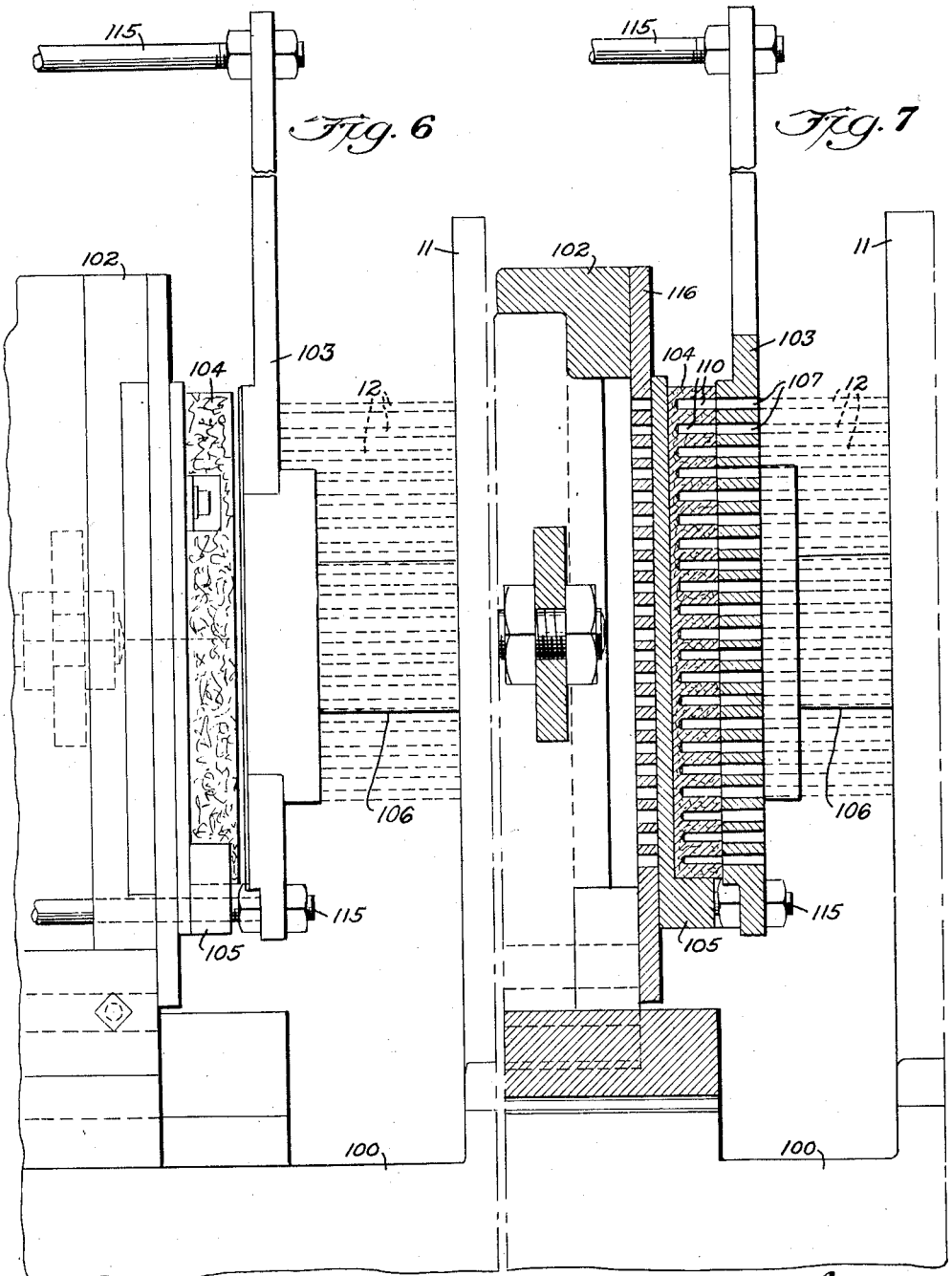

Patented June 19, 1945

2,378,618

UNITED STATES PATENT OFFICE 2,378,618

APPARATUS FOR PERFORATING MATERIAL

George H. Burt, Metairie, La., assignor to The Celotex Corporation, Chicago, Ill., a corporation of Delaware Application December 19, 1941, Serial No. 423,700

11 Claims. (Cl. 77—22)

This invention relates to an apparatus for perforating material, and particularly to a type of multiple spindle drill adapted for drilling the perforations in acoustical material, requiring a large number of perforations within a relatively small area, the invention having for its object to provide an apparatus which will be simple to carry out and more efficient in operation than those heretofore proposed.

With these and other objects in view the invention resides in the novel details of construction and combinations of parts constituting the apparatus, all as will be disclosed more fully hereinafter and particularly covered by the claims.

Referring to the accompanying drawings forming a part of this specification and in which like numerals designate like parts in all the views, Fig. 1 is a side elevation of a machine made in accordance with this invention;

Fig. 2 is a sectional view taken through the supports for one of the multiplicity of similar drills, and illustrating the rotary motion imparted thereto;

Fig. 3 is a plan view of one form of acoustical material which has been drilled or perforated by the apparatus of this invention;

Fig. 4 is a detail sectional view illustrating a drill about to penetrate a piece of acoustical material;

Fig. 5 is a detail sectional view illustrating a perforation made in acoustical material by one of the drills;

Fig. 6 is a side elevational view of a portion of the platen or drill table with a stripper plate positioned to permit the insertion of a piece of acoustical material to be drilled;

Figure 9:
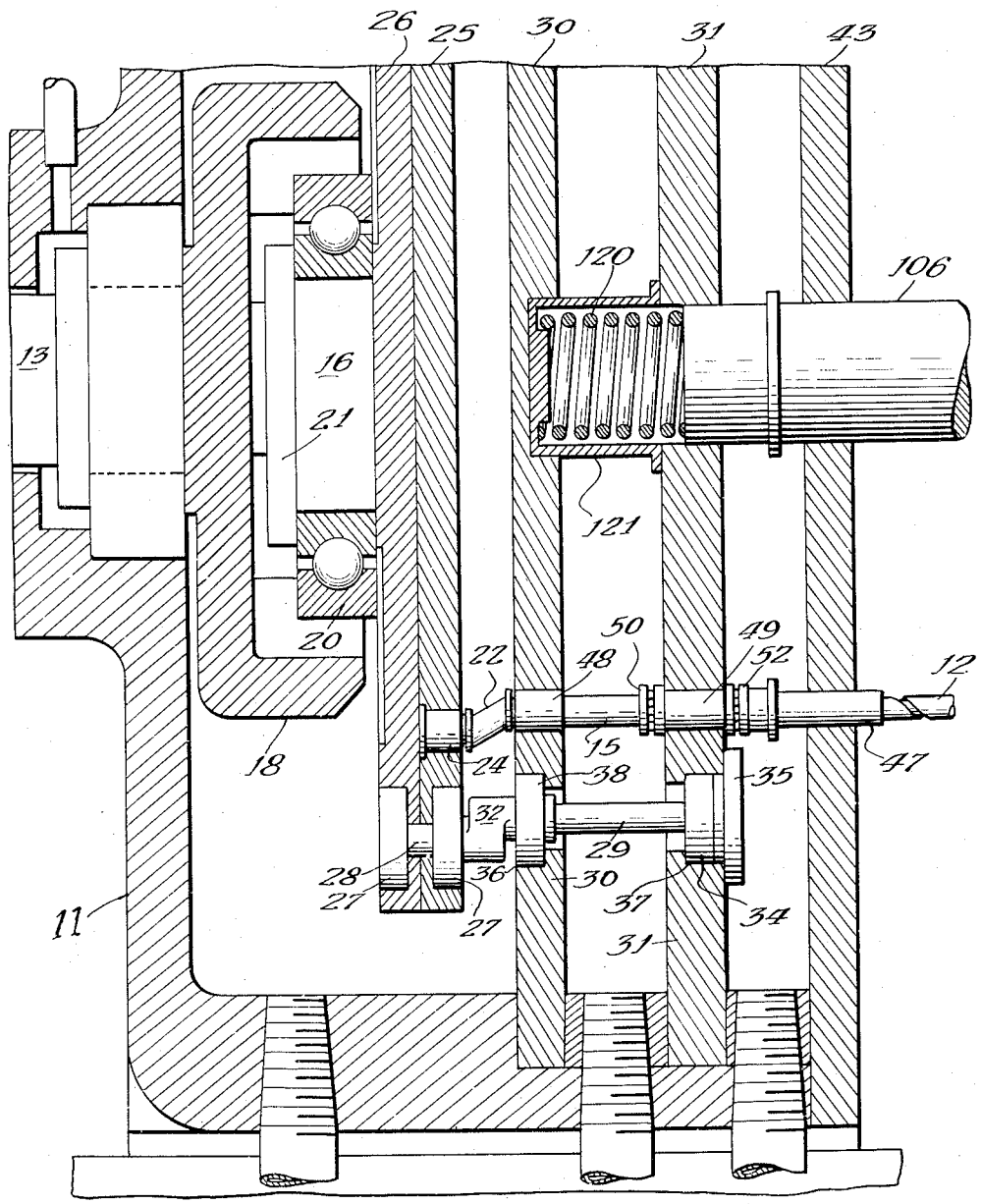

Fig. 7 is a view similar to Fig. 6 but mostly in section to illustrate the stripper plate clamping the acoustical material to the platen and clearly showing the perforations formed in said material by the multiple drills; and Fig. 8 is a fragmentary detail view illustrating one means of transforming the rotary motion of the main drive shaft to an eccentric or circular oscillatory motion of the eccentric plate employed for operating the multiple drills.

Fig. 9 is a partial sectional view taken on a diameter of the drill head to show the drill head housing construction.

In my copending application for patent filed October 28, 1939, under the Serial Number 301,708 and entitled Multiple spindle drilling apparatus (Patent No. 2,342,251, Feb. 22, 1944), there is fully disclosed a multiple spindle drill head substantially the same as herein contemplated, as well as a mechanism by which rotary motion of a main operating shaft was translated into circular oscillatory motion of an eccentric disk which latter had journaled therein the cranks formed at one end of the multiple spindles having the drills at their other ends, wherefore it is not necessary here to repeat such disclosure since this invention has to do with the operation of a plurality of similar drills upon acoustical or other material to be perforated, regardless of the specific means employed to impart rotation to said drills. However, in Fig. 2 there is illustrated in detail a portion of the disclosure illustrated in said application and to which the same reference numerals have been given, so that it may be readily apparent to one skilled in the art how the rotary motion is imparted simultaneously to all of the plurality of drills.

That is to say, there is a drill head 11 provided with a plurality of drills such as 12 of similar size, shape and extent, for perforating particularly sound absorbing material such as fiber insulation board to form an acoustical correction material, said material comprising vegetable and/or wood fibers which have been felted into sheet formation having a relatively compressible surface and which may have been subjected to such proofing as is desired. Such material is well known in the market under various trade-marks as "Celotex," "Insulite," "Masonite," "Flintkote," "Homasote," and numerous others, but this invention also contemplates material other than lignocellulosic, such as tile and/or panels fabricated from rock wool, glass wool, etc., particularly inorganic fibers of various kinds.

Such fibrous material, when utilized as an acoustical corrective material, is preferably formed into tile substantially 12 inches by 12 inches, or multiples thereof, and substantially ¼ inch to 1½ inches in thickness depending upon the amount of sound absorption desired. Such material is then drilled or punched with a multiple spindle apparatus to form similar perforations spaced substantially $1\frac{1}{2}$ of an inch apart so that each square foot of the tile has substantially 441 perforations (see Fig. 3) uniformly spaced, of a uniform depth, and each having a diameter of substantially $\frac{1}{16}$ of an inch. It is obvious that variations in the size and shape and number of perforations may be had without departing from the scope of the invention, and that the arrangements of such perforations may be varied to form any desired design.

It is preferred to actuate all of the drills in the multiple spindle head simultaneously from a main spindle or main drive shaft such as 13 which may be the shaft of the electric motor 101 or a continuation thereof, and hence said shaft at its extremity may be provided with a cam or eccentric engaging a member carried by the flat face of an eccentric plate or disk 14 to which disk each of the drills is operatively connected by drill spindles such as 15. The axis of the shaft 13 is preferably perpendicular to the flat face of the disk 14 and disposed near the central portion thereof.

An eccentric drive, generally identified by the numeral 17, is illustrated in Fig. 8 wherein the disk 14 is provided with a stub shaft 16 the axis of which is eccentric with respect to the axis of the main drive shaft 13 and this stub shaft is mounted in the ball bearing 20 the inner race of which preferably is pressed onto the stub shaft and held in place thereon by a collar 21, and the outer race of which is press-fitted into spaced webs 19 of an annular housing 18 upset on, or otherwise affixed to, the main drive shaft 13. Thus it will be understood that the rotary motion of shaft 13 will, through such eccentric connection, impart circular oscillatory motion to the disk 14 in the plane of its flat face. The amount of eccentricity is substantially ¼ of an inch for the $\frac{7}{16}$ inch diameter drills positioned $1\frac{1}{2}$ of an inch apart, but of course this eccentricity may be varied.

Each of the plural drill spindles, such as 15, is driven from the eccentric disk 14 through an eccentric crank 22 which has a stub crank shaft 23 journaled in a bearing 24 mounted in a plate member 25 associated with the eccentric disk, the plate member 25 being preferably formed by boring the plate with the number and spacing of holes equal to the number and spacing of spindles to be used, and pressing the bearings 24 therein. In other words the eccentric disk 14 is preferably formed of two members 25 and 26, the outer plate member 25 serving as a common mounting for all of the crank shafts 23 of the drill spindles, while the inner plate member 26 provides the eccentric connection with the main drive shaft 13. The plate members 25 and 26 are contiguously mounted for identical movement and provide, through the ball bearings 27, journals for stub crank shafts 28 of crank shafts 29 journaled in stationary inner and outer spindle bearing plates 30 and 31 respectively, which spindle bearing plates 30 and 31 are rigidly mounted in spaced parallel relation with each other.

The crank shafts 29 take the thrust of the spindles 12 and support the weight of the eccentric disk 14 by virtue of their crank arms 32 and cranks 28, the latter secured by a thrust collar 33 within the bearing 27. The crank arms 32 have the same eccentricity as the eccentric drive (cam) between the power shaft 13 and the eccentric plate 14, and which is the same eccentricity as that given to the cranks 22 of the drill spindles 15. The stationary supporting plates 30 and 31 preferably are provided with four crank shafts 29 because the eccentric disk 14 is preferably rectangular, whereby said crank shafts are connected to said disk at its corners.

The crank shafts 29 have their outer ends journaled in bearings such as 34 and secured as by the thrust collar 35. The plates 30 and 31 are bored so that the axes of holes 36 and 37, for mounting the bearings 38 and 34, are in alignment, the bearing 38 likewise supporting the crank shaft 29, and a thrust collar or sleeve 39 may be employed between the plates 30 and 31 and abutting the bearings 34 and 38. An oil cap or seal 40 is placed over the ball-bearing 34. The spindle plates 30 and 31, and a cover plate 43 for the drill head 11, are all in alignment as to the holes provided therein for the plurality of drill spindles, and clearance is provided in the cover plate for collets 47 mounted on the drill spindles to receive the drills 12.

A typical drill spindle assembly, for this multiple spindle drill head, comprises the drill spindle 15, the drill collet 47, and the drill 12. The inner end of the drill spindle has the crank connection with the eccentric disk 14 for rotation of said spindle by the circular oscillation of said disk. The drill spindle is journaled in bearings or bushings 48 and 49 in the stationary supporting plates 30 and 31 respectively, with a reverse thrust bearing 50 mounted contiguously to the inner side of the spindle bearing plate 31, and a thrust bearing 52 is mounted on said spindle between said plate 31 and the collet 47. Said collet is preferably threaded on to the end of the drill spindle, and the tang of the drill 12 is preferably secured, by a drill lock-pin or other suitable form of securing means, within the collet so that the drill may be readily attached and detached.

In Fig. 9 of the drawings there is shown a section of the drill head housing 11 and which clearly discloses that this head is divided into three chambers which are formed in the drill head 11 between spindle bearing plates 30 and drill head housing 11 between spindle bearing plates 30 and 31, and between spindle bearing plate 31 and cover plate 43, and in connection with which these various members, in addition to forming separate lubricating chambers for the drill head mechanism, provide suitable supports and inclosing housing therefor. For any further understanding of the features of lubrication involved, reference is made to copending application, Serial No. 301,708, filed October 28, 1939, and hereinbefore referred to.

The drill head 11 is secured to a rigid supporting frame 100, and mounted adjacent to the drill head is a motor 101 having the shaft 13 (or having a shaft which preferably is directly coupled to the drive shaft 13 heretofore described) for directly driving the eccentric disk 14 and consequently the plurality of drills 12 in said drill head. The drill head 11 is intermediately positioned on the frame 100 between said motor and the platen 102 which latter is preferably hydraulically driven and is moved longitudinally of said frame (axially of the drills) to clamp the material to be drilled, perforated (or punched) to the stripper plate 103 and to advance said clamped material to the drills for simultaneous perforation thereby, the hydraulic actuation of the platen being automatic and the platen given movement thereby backward and forward in a cycle of a few seconds duration, sufficient in time to permit placement and removal of the fibrous tile 104 into and out of position on the tile support or guide 105.

The stripper plate 103 is provided with a plurality of holes, a hole for each drill 12, and as seen in Fig. 1 said plate is supported by symmetrically disposed members such as 106 extending into the casing of the drill head 11 and either operating against springs 120 positioned in housing 121 mounted between spindle bearing plates 30 and 31 or serving as pistons in hydraulic cylinders, the intention being that the stripper plate is to be yieldably mounted. That is to say, when a tile 104 is in position to be perforated and the platen 102 moves it to the left, as seen in said Fig. 1, the tile first comes into contact with the flat surface of the stripper plate 103 and then in its continued movement causes the stripper plate to move bodily to the left against the tension of said springs or the resistance of the hydraulic cylinders, until the limit of the platen movement is reached, at which time the drills 12 will have made the desired perforations in the tile. In Fig. 1 only the outermost rows (uppermost and lowermost) of drills 12 have been illustrated, in the interest of clarity.

When the platen moves to the right, after the perforations have been formed in the tile, the tensioned stripper plate 103 continues to remain in surface contact with the tile thereby keeping the tile pressed against the platen, due the fact that the pressure of the springs or the resistance of the cylinders is greater than the combined friction of all the drills in the material of the tile. Consequently the stripper plate moves with the tile to the right until after all of the drills have become disengaged from the tile, at which time the stripper plate will have reached the limit of its movement to the right and hence will stop, but the platen 102 continues moving to the right a sufficient distance (which can be regulated) to permit the perforated tile to be removed, and a fresh tile placed on the support 105 for subsequent perforation as just described.

Thus it will be understood that the stripper plate strips the tile from the plurality of drills. Since the tile is preferably of fibrous material, there is a tendency of the fibers being pulled or misplaced upon removal of the drills therefrom which might result in a tearing or malformation of the tile in the region of the perforations. Therefore, the holes in the stripper plate may be made just large enough in diameter to pass the drills therethrough, so that the edges of the tile perforations will be reinforced or supported by the metal of the stripper plate, and thus be prevented from malformation, as the drills are removed. This construction also provides in effect bearings and/or guides for the drills.

Preferably, however, each drill hole such as 107 in the stripper plate is of a diameter greater than the diameter of a drill, in order to accommodate a hardened steel bushing 108 serving as a bearing and/or guide for the drill. This bushing is made cylindrical and so positioned and secured in its hole 107 that a slight portion of the end of the bushing extends out of, or beyond the tile-engaging face of, the stripper plate, and this extending end of the bushing has its outermost edge bevelled or chamfered as indicated in the drawings so that said end has the shape of a truncated cone. By this construction, the conical end of each bushing is forced into the yieldable surface of the fibrous tile when the tile and the stripper plate are pressed together, thereby placing the fibers of the tile under increased compression at 109 (see Fig. 4) in the face of the tile at the area where a drill is to penetrate the tile. With the fibers under such increased compression, the drill will make a cleaner or sharper cut hole in the tile, and be less liable to malform the edge of the tile perforation upon removal of the drill, leaving a perforation in the tile as indicated at 110 in Fig. 5. The conical indentation formed by the conical end of the bushing may partially remain in the face of the perforated tile but this will not impair, and rather will improve, the appearance of the tile, and further will assist in the direction of sound waves into the tile perforation when the tile is in use.

In Figs. 6 and 7 the stripper plate 103 is shown with its supports 106 extending into the drill head 11, and a tile 104 in spaced relation (as for insertion in and/or removal from the tile support 105) and clamped relation respectively with respect to said plate. If found necessary, said plate may be provided with tension equalizer rods such as 115, operating in appropriate recesses in the mounting for the platen 102, this construction being appropriate when drilling tile of large dimensions but not being fully illustrated since it is well understood in mechanical structures. The tile support 105 may also be made replaceable and/or adjustable, as indicated in dotted line representation in Fig. 1, in order to accommodate tiles of different dimensions.

In case a tile is to be provided with perforation extending entirely therethrough, a back plate 116 may be mounted upon the plate (see Fig. 7) and provided with a plurality of holes as shown, which holes will be positioned and of the requisite size to register with and closely receive therein the ends of the drills 12 (or punches) after passing through the tile, whereby the tile will be reinforced by the metal of said back plate in the region adjacent the drilled or punched perforations and thus provide clean cut and/or sharply defined edges to the perforations on the back face of the tile. The back plate may or may not be provided with a shelf or foot for supporting the tile, like 105.

Reference has heretofore been made to perforations made either by drills or punches. It is obvious that punches may be substituted for the drills 12 since either type of perforator will produce the desired tile product, namely a tile having apertures extending inwardly from a face thereof to receive and absorb sound waves, whether the such apertures extend only part way or entirely through the tile. Punches are also contemplated which are given partial twist or no axial rotation and which, like the drills, may be hollow or not, as found most suitable. Punches may be employed since the platen is moved toward and away from the stationary drill head by mechanical power sufficient to cause the punches mounted on the drill head, to make the desired perforations in the tile. Whether drills or punches are employed, the stripper plate 103 is utilized for the purpose heretofore explained.

It is obvious that those skilled in the art may vary the details of construction and arrangements of parts constituting the apparatus, as well as vary the steps and combination of steps constituting the method, to produce the article herein contemplated, without departing from the spirit of this invention, wherefore it is desired not to be limited to the exact foregoing disclosure except as may be required by the claims.

What is claimed is:

1. In a multiple spindle drilling apparatus, a drill head assembly comprising a plurality of drills having drill spindles, a housing for the drill spindles, spaced partitions in said housing and in which said drill spindles are journaled, said partitions with the walls of said housing providing a lubricant-containing chamber, means mounted on one side of said chamber for driving the drill spindles, and a stripper plate disposed on the opposite side of said chamber and receiving the drills therethrough, said stripper plate having members mounted in said partitions and passing through said chamber, said members being under yieldable tension to separate said drills from the material being drilled.

2. In a multiple spindle drilling apparatus, a drill head assembly comprising a plurality of drills having drill spindles, each drill spindle having an eccentric crank at one end thereof, a housing for the drill spindles, spaced partitions in said housing and in which said drill spindles are journaled, said partitions with the walls of said housing providing a lubricant-containing chamber, eccentric drive means comprising an eccentric plate adapted for journaling the eccentric cranks of the drill spindles and adapted to drive said drill spindles with rotary motion, said eccentric plate mounted on one side of said chamber, and a stripper plate disposed on the opposite side of said chamber and receiving the drills therethrough, said stripper plate having members mounted in said partitions and passing through said chamber, said members being under yieldable tension to separate said drills from the material being drilled.

3. The combination in a multiple spindle drill head, of a drive shaft, the drill head comprising a plurality of drills having drill spindles therefor, a plurality of chambers one of which is adapted to contain a liquid lubricant and opposite walls of which are adapted to journal the drill spindles, an eccentric drive plate disposed in another chamber, means for supporting said eccentric plate, said means journaled in the partition of the first mentioned chamber, and comprising a plurality of crank shafts having bearings in the eccentric plate, eccentric means for driving the eccentric plate from the drive shaft, and a stripper plate receiving the drills therethrough and having members longitudinally reciprocable through the lubricant containing chamber.

4. A multiple spindle drill head assembly comprising a housing, spaced partitions within said housing forming a lubricant-containing chamber, a plurality of drills the spindles of which pass through said chamber and have journals in opposite walls thereof, an eccentric drive plate operatively supported on one side of said chamber for imparting rotary motion to the drill spindles, and a drill stripper plate disposed on the opposite side of said chamber and having members passing through a wall of said chamber.

5. A multiple spindle drill head assembly comprising a housing, spaced partitions within said housing forming a lubricant-containing chamber, a plurality of drills the spindles of which pass through said chamber and have journals in opposite walls thereof, a crank on an end of each drill spindle, an oscillatory eccentric drive plate adapted for journaling the cranks of the drill spindles, said drive plate operatively supported on one side of said chamber for imparting rotary motion to the drill spindles through their cranks, and a drill stripper plate disposed on the opposite side of said chamber and having supporting members passing through and slidable in a wall of said chamber.

6. A multiple spindle drill head assembly comprising a housing, spaced partitions within said housing forming a lubricant-containing chamber, a plurality of drills the spindles of which pass through said chamber and have journals in opposite walls thereof, a crank on an end of each drill spindle, an oscillatory eccentric drive plate adapted for journaling the cranks of the drill spindles, said drive plate operatively supported on one side of said chamber for imparting rotary motion to the drill spindles through their cranks, and a drill stripper plate disposed on the opposite side of said chamber and having supporting members passing through and slidable in a wall of said chamber, the drive plate and the stripper plate each being disposed transversely of the axes of the drill spindles.

7. In a work-perforating apparatus, a head assembly comprising a plurality of closely spaced perforators, a work-supporting platen and means for moving the same toward and away from said perforators for causing perforation of the work, and a stripper plate mounted under yieldable pressure on said head, said stripper plate having bores to receive the perforators therethrough and a bushing in each such bore closely fitting the perforator received therein, said stripper plate movable longitudinally of the perforators upon contact with the work to be perforated.

8. In a work-perforating apparatus, a head assembly comprising a plurality of closely spaced perforators, a work-supporting platen and means for moving the same toward and away from said perforators for causing perforation of the work, and a stripper plate mounted under yieldable pressure on said head, said stripper plate having a work-engaging face and bores to receive the perforators therethrough, a bushing in each such bore closely fitting the perforator received therein, each bushing extending outwardly of the stripper plate beyond its work-engaging face, said stripper plate movable longitudinally of the perforators upon contact with the work to be perforated, whereby the work is compressed between said platen and said stripper plate during the perforating thereof and is additionally compressed by the extending ends of said bushings in the region of the perforations.

9. In a work-perforating apparatus the combination with a perforator and a work-supporting platen movable toward and away from the perforator for causing perforation of the work, of a stripper plate for separating the work from the perforator, said stripper plate having a work-engaging face and together with said platen placing the work being perforated under compression, said stripper plate having a bore through which the perforator passes and provided with means for placing the work under additional compression in the region of the perforation during the action of the perforator.

10. In a work-perforating apparatus the combination with a perforator and a work-supporting platen movable toward and away from the perforator for causing perforation of the work, of a stripper plate for separating the work from the perforator, said stripper plate having a bore through which the perforator passes, and a bushing in said bore closely fitting the perforator, said bushing extending outwardly of the stripper plate beyond the work-engaging face thereof.

11. In a work-perforating apparatus the combination with a perforator and a work-supporting platen mounted for relative movement therebetween, of a stripper plate for separating the work from the perforator, said stripper plate having a bore through which the perforator passes, and a bushing in said bore closely fitting the perforator, said bushing extending outwardly of the stripper plate beyond the work-engaging face thereof.

GEORGE H. BURT.